Jan. 1, 1957  D. B. RUSH  2,775,902
BELT
Filed April 8, 1954

INVENTOR.
DALE B. RUSH,
BY: Harold B. Hood
ATTORNEY.

United States Patent Office 2,775,902
Patented Jan. 1, 1957

2,775,902
BELT

Dale B. Rush, Columbus, Ind., assignor, by mesne assignments, to The Reliance Electric and Engineering Company, Cleveland, Ohio, a corporation of Ohio Application April 8, 1954, Serial No. 421,795

2 Claims. (Cl. 74—234)

The present invention relates to belt construction and particularly to that for the edge-active type of belt used in V-pulley drives.

Belts of this type which are intended for heavy duty work are, more or less, conventionally constructed with a body strand readily flexible both longitudinally and transversely (that is, about axes extending transversely of the strand length and about axes extending longitudinally of the strand) and (reinforced with transversely extending, pressure-sustaining stiffener elements provided at their ends with friction pads for engagement with the faces of the V-pulleys. Such pads are conventionally cemented, or otherwise bonded, to the ends of the stiffener elements and, for this reason, very often work loose resulting not only in damage to the belt but also in damage to the faces of the V-pulleys over which the belt is running. The driving force, in such a structure, is transmitted from the pulleys to the body strand of the belt through the stiffener blocks, thereby giving rise to the problem of holding the blocks in non-slipping relation on the body strand.

The primary object of this invention is, therefore, to provide a belt of the above mentioned type which will effectively overcome the mentioned difficulties now experienced in conventional type belt structures.

Ancillary objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
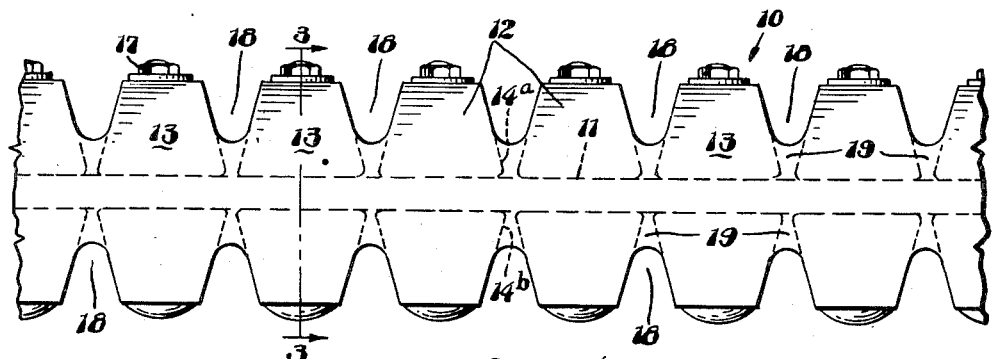
Fig. 1 is a side elevation of a fragment of a belt constructed in accordance with my invention.
Figure 2:
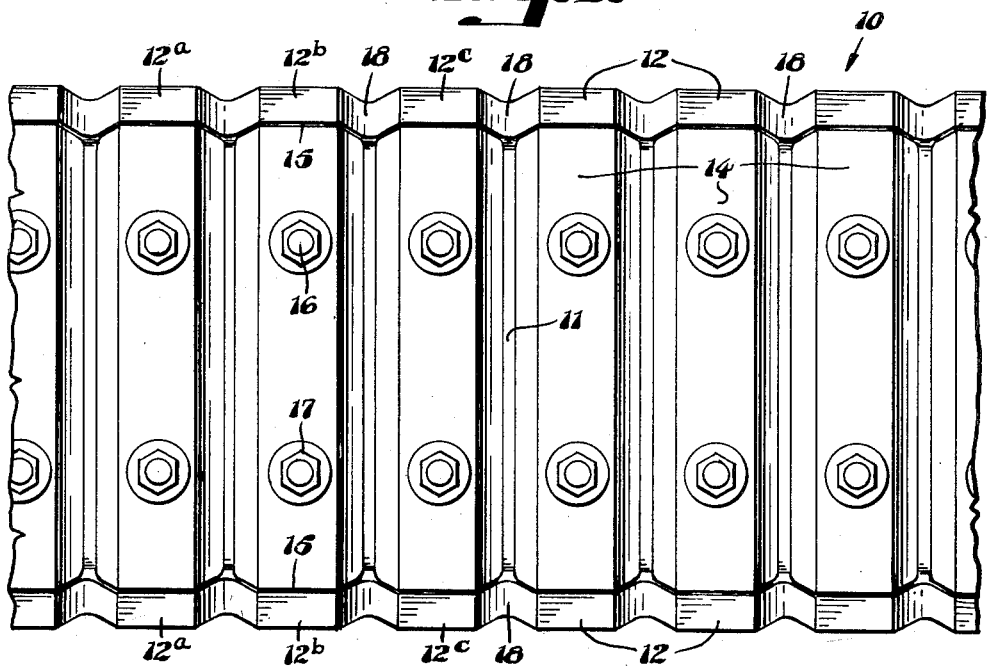
Fig. 2 is a plan view of the belt fragment of Fig. 1.
Figure 3:
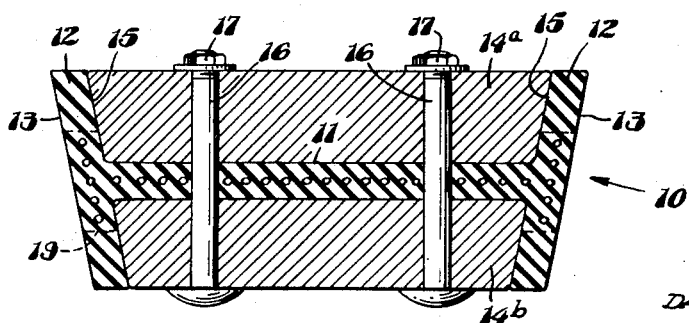
Fig. 3 is a transverse sectional view taken substantially on line 3—3 of Fig. 1 and showing the detail of my belt structure.

Referring more particularly to the drawings, it will be seen that I have illustrated my belt, referred to generally by the reference numeral 10, comprising a body strand 11 having integrally formed along the edges thereof a plurality of pad members 12. Such pad members are arranged in opposed pairs, 12a, 12b, 12c, etc. These pad members extend in both directions from the plane of body strand 11, as clearly shown in Figs. 1 and 3. Each pair of pad members 12 presents oppositely facing surfaces 13 allochirally angularly related to the longitudinal median plane of the body strand 11.

A plurality of pairs of stiffener blocks 14a and 14b are arranged on the body strand 11 with the ends thereof in pressure-sustaining engagement with the adjacent surfaces 15 of the pad members 12. These stiffener blocks are arranged on both the upper and lower surfaces of body strand 11, and the ends of each are made to conform to the angular setting of the pad members 12. The pad members 12 may or may not be bonded to the ends of the stiffener blocks 14, as the particular application of the belt may require.

Each pair of stiffener blocks 14a and 14b is fixed to the body strand 11 in any suitable manner such as, for instance, by means of passing the bolts 16 through aligned bores in the stiffener blocks 14 and the body strand 11. The nuts 17 are turned down upon the bolts 16 to clamp the stiffener blocks tightly against body strand 11.

The pad members 12 may be individually moulded along the edges of the body strand 11, or they may be formed by first providing flanges along the opposite edges of the body strand 11, and then by notching such flanges as at 18 to define the individual pad members 12. However such pad members are formed, I prefer, in some instances, to terminate the notches 18 short of the adjacent surface of the body strand 11 to provide webs 19 between adjacent ones of the pad members 12. Thereby, the forces will be transmitted from the V-pulley to the body strand 11 by way of the pad members 12. Part of the force, however, will be sustained by the webs 19 thereby increasing the tensile strength of the belt 10.

By so constructing a belt of the type here under consideration in accordance with my invention, the manufacture of such a belt is not only greatly simplified, but the belt itself is greatly improved. No longer is there the problem of bonding individual pad members 12 to the ends of the pressure-sustaining elements 14 and of having such pad members subsequently become loosened with the above mentioned disastrous results. Additionally, since the forces are transmitted directly from the pad members 12 to the body strand 11, I have found that the belt is thereby capable of transmitting substantially larger forces than are such belts now constructed in accordance with conventional practices.

I claim as my invention:

1. An edge-active belt comprising a body strand formed of material of high tensile strength but readily flexible both longitudinally and transversely, said strand having formed integrally along the opposite edges thereof flanges extending in both directions from the plane of said strand and presenting opopsitely facing surfaces allochirally angularly related to the longitudinal median plane of said strand, said flanges, along the opposite edges of each thereof, being notched toward the adjacent surface of said body strand to define opposed pairs of pad members, a plurality of pairs of transversely rigid stiffener blocks arranged on the opposite surfaces of said strand in registry with each such pair of pad members and with the ends thereof in pressure-sustaining engagement with the adjacent surfaces of such pad members, and means penetrating each of said pairs of stiffener blocks and said body strand and operable to so clamp said stiffener block pairs to the opposite surfaces of said body strand.

2. The device of claim 1 in which said notches defining said pad members terminate short of the adjacent plane of said body strand to define webs between adjacent ones of said pad members.

References Cited in the file of this patent

UNITED STATES PATENTS

| 1,238,494 | Chisholm | Aug. 28, 1917 |
| 1,792,242 | Reeves | Feb. 10, 1931 |
| 1,862,198 | Reeves | June 7, 1932 |